Figure 1:
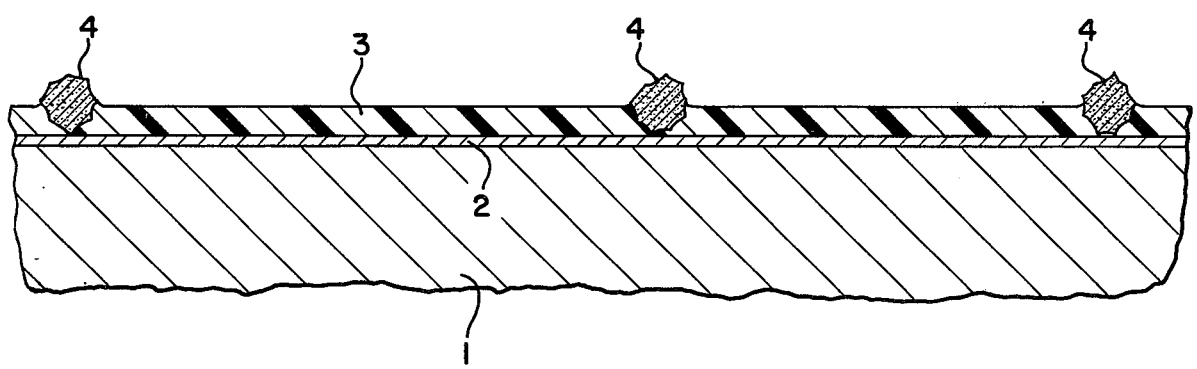

United States Patent [19]

Wesner

[11] 4,154,276

[45] May 15, 1979

[54] TORQUE MODIFYING COATING FOR THREADED FASTENERS

[75] Inventor: Donald R. Wesner, Elgin, Ill.

[73] Assignee: Illinois Tool Works Inc., Chicago, Ill.

[21] Appl. No.: 614,460

[22] Filed: Sep. 18, 1975

Related U.S. Application Data

[63] Continuation of Ser. No. 488,370, Jul. 15, 1974, abandoned.

[51] Int. Cl.² ............................................. F16B 39/22
[52] U.S. Cl. .................................... 151/14.5; 427/203
[58] Field of Search .................. 151/14.5, 7; 85/1 C, 85/10 F; 29/459; 427/180, 203

[56] References Cited

U.S. PATENT DOCUMENTS

| 1,027,782 | 5/1912 | Watrous | 85/1 C |
| 2,165,955 | 7/1939 | Vander Merweharhof | 427/203 X |
| 2,748,701 | 6/1956 | Barrows | 427/180 X |
| 3,059,697 | 10/1962 | Pitts | 151/14.5 X |
| 3,480,461 | 11/1969 | Lynge | 427/203 X |

FOREIGN PATENT DOCUMENTS 701599 1/1965 Canada .................................... 151/14.5

*Primary Examiner*—Ramon S. Britts
*Attorney, Agent, or Firm*—Thomas W. Buckman; Robert W. Beart

[57] ABSTRACT

A coating for a threaded fastener including a mixture of grit particles embedded in a rigid resin and carrier base so that the particles are stationarily positioned between the outer surface of the fastener and an associated workpiece surface to increase the torque required to strip the fastener.

2 Claims, 1 Drawing Figure

TORQUE MODIFYING COATING FOR THREADED FASTENERS

This is a continuation, of application Ser. No. 488,370, filed July 15, 1974, now abandoned.

This invention relates broadly to threaded fasteners and more particularly to threaded fasteners which have been treated with a coating designed to increase the amount of torque required to strip the fastener from mating threads formed in an associated workpiece.

The widespread use of threaded fasteners to secure items to relatively thin sheet metal plates has presented considerable problems in preventing the fastener from stripping from threads formed in the sheet metal as the fasteners are driven to the fully seated position. This problem becomes extremely critical since fasteners are frequently driven using clutch controlled power drivers in assembly lines. The clutch mechanisms of such power drivers cannot be relied upon to disengage at precisely the same torque level each time and, therefore, it is not feasible to use screws which require a driving torque substantially equal to the torque required to strip the screw from the workpiece. Thus, it is particularly desirable to maximize the differential between the driving torque and strip.

Certain prior art screws utilize nibs or other protrusions beneath the bearing surface of the head to rob the screw of torque which would normally strip the screw from the workpiece. This has the obvious disadvantage of marring the surface of the workpiece and requires a unique configuration to the screw head. Other efforts to achieve a maximization of differential between drive and strip torques have been based upon the use of special thread or shank configurations.

It is an object of this invention to provide a coating to a threaded fastener which is particularly designed to increase the friction between the bearing surface of the head of the fastener and the workpiece surface thus increasing the torque required to strip the fastener from the workpiece.

It is another object of the invention to provide a coating to a threaded fastener which will increase the strip torque to drive torque differential while still allowing the fastener to be plated with conventional plating or corrosive resistant materials.

It is still another object of the invention to provide a coating on a threaded fastener which will modify the drive and strip torques while not appreciably changing the appearance of such a fastener.

In accordance with the invention, a threaded fastener member is coated with a resin carrier having abrasive grit particles embedded and retained therein. The abrasive grit particles are chosen from a group consisting of aluminum oxide, pomice, silicon carbide and silicon dioxide. The resin carrier is of a lacquer-type selected from a group consisting of nitrocellulose, acrylic, vinyl chlorinated and alkyd.

Understanding of the invention may be facilitated by referring to the accompanying drawing which is an enlarged cross-sectional view of a portion of a fastener showing a coating in accordance with the invention.

In FIG. 1, a fastener shank 1, generally of carbon steel, may be provided with a corrosive resistant layer 2, such as zinc. The slurry coating of carrier resin 3 and abrasive grit particles 4 is applied and cured to the fastener on predetermined surface areas thereof.

The carrier resin is preferably utilized with a solvent evaporation vehicle, such as lacquer thinner, to modify the viscosity and aid in the distribution of the particles which results in a thin, uniform coating on the fastener.

In applying the coating to a fastener, a predetermined percentage, by weight, of the abrasive grit particles is mixed in the resin carrier with the appropriate solvent evaporation vehicle to provide a slurry which is then applied and cured to the body of the threaded fastener and preferably to the undersurface of the enlarged head of the fastener. It is also preferable to plate or finish the fastener with a conventional corrosive resistant material, such as zinc.

The preferred coating is a slurry of 3% to 10% by weight of silicon carbide particles of approximately 320 mesh size mixed with the lacquer carrier including approximately 50% lacquer thinner.

Examples of the effect that the preferred coating of the subject invention has on the drive/strip torque ratio can be summarized as follows:

| Uncoated | | Coated with 3% by wt. 320 SiC in 50% acrylic + 50% lacquer thinner | | Coated with 10% by wt. 320 SiC in 50% acrylic + 50% lacquer thinner | |
|---|---|---|---|---|---|
| Drive Torque (in./lb.) | Strip Torque (in./lb.) | Drive Torque (in./lb.) | Strip Torque (in./lb.) | Drive Torque (in./lb.) | Strip Torque (in./lb.) |
| 10.3 | 25.5 | 8.2 | 34.6 | 8.1 | 31.2 |
| 6.7 | 22.7 | 9.3 | 32.0 | 12.1 | 34.5 |
| 7.8 | 27.4 | 10.6 | 30.8 | 10.2 | 31.5 |
| 8.2 | 24.4 | 8.7 | 31.1 | 11.0 | 33.3 |
| 8.6 | 20.7 | 8.5 | 32.1 | 9.5 | 36.5 |
| 6.5 | 25.6 | 8.5 | 31.0 | 9.4 | 40.0 |
| 7.3 | 21.1 | 8.7 | 34.7 | 12.1 | 35.3 |
| 8.2 | 22.3 | 9.9 | 30.3 | 11.7 | 36.7 |
| 8.6 | 24.9 | 9.8 | 34.6 | 11.1 | 38.9 |
| 7.5 | 23.4 | 9.6 | 32.0 | 12.5 | 33.8 |
| Av. 7.9 | 23.8 | 9.1 | 32.2 | 10.8 | 35.2 |

The above results were achieved by measuring drive and strip torques on representative 8–18×½" screws as they were driven through a test plate of 0.031" of 1010 CRS Rb 62 steel and a 0.089" bearing plate of 1010 CRS Rb 62 steel with a 0.196" clearance hole. The drill test fixture was operated at 2500 rpm with 30 lbs. axial load. The test samples were prefinished by zinc plating.

Another example of the increase in differential between drive and strip torque achieved by the present invention is shown in the following drive torque—strip torque figures obtained by measuring drive and "strip torques on representative 8–32×½" screws as they were driven through a test plate of 0.015" 1010 CRS Rb 38 steel and a 0.031" bearing plate of 1010 CRS Rb 62 with a 0.196" clearance hole. The drill test fixture was operated at 1100 RPM with a 20 lb. axial load. The test samples were again prefinished with zinc plating.

| Uncoated | | Coated with 3% by wt. 320 SiC in 50% acrylic + 50% lacquer thinner | |
|---|---|---|---|
| Drive Torque (in./lb.) | Strip Torque (in./lb.) | Drive Torque (in./lb.) | Strip Torque (in./lb.) |
| 2.9 | 13.4 | 4.9 | 15.7 |
| 5.1 | 13.7 | 3.3 | 16.8 |
| 3.3 | 15.1 | 6.2 | 16.3 |
| 4.3 | 14.9 | 5.3 | 16.9 |
| 3.9 | 13.2 | 3.3 | 15.3 |
| 4.4 | 14.0 | 3.2 | 16.3 |
| 4.1 | 13.8 | 3.4 | 17.9 |
| 3.9 | 13.4 | 3.9 | 18.9 |
| 4.6 | 14.1 | 5.3 | 19.5 |
| 3.7 | 14.7 | 3.7 | 16.5 |
| 4.0 | 14.5 | 4.0 | 17.8 |
| 3.8 | 13.9 | 4.0 | 16.7 |
| 2.9 | 13.5 | 5.7 | 18.1 |
| 4.1 | 13.2 | 3.7 | 18.3 |
| 4.5 | 12.7 | 4.0 | 18.6 |
| 3.7 | 13.6 | 6.3 | 18.9 |
| 3.6 | 12.8 | 4.6 | 17.9 |
| 3.3 | 13.1 | 3.7 | 20.7 |
| 4.5 | 13.6 | 3.0 | 16.5 |
| 3.1 | 13.0 | 4.7 | 18.3 |
| 5.5 | 12.7 | 5.0 | 20.8 |
| 3.2 | 14.1 | 3.7 | 18.1 |
| 4.6 | 15.2 | 4.2 | 16.5 |
| 3.0 | 12.0 | 4.8 | 20.1 |
| 3.9 | 14.6 | | |
| Av. 3.9 | 13.7 | 4.2 | 17.1 |

It should be apparent from the above examples that the critical differential between the drive and strip torques is increased a substantial percentage through the use of the coating of the present invention.

It has been determined that abrasive grit particles chosen from the group consisting of aluminum oxide, pomice, silicon carbide and silicon dioxide of a mesh size between 120 and 600 are preferable for use in this invention. If the particles are significantly larger than 120 mesh size, the coating and particles would be highly visible and may be undesirable from a cosmetic standpoint. In addition to the cosmetic effect, larger particles will necessitate a greater thickness of carrier material and this combination of large grit particles and increased carrier thickness may be detrimental to any attempt to increase the differential between drive torque and strip torque since the increased material on the threads would increase the drive torque an undesirable amount. If the particles are extremely small, the resin carrier would be required to be extremely thin in order to allow protruding cutting edges to function in accordance with the invention. The surface tension of the preferred resin would not normally allow the carrier to be spread so thin as to accommodate smaller particles.

In actual practice it has been found that best results are achieved when using a carrier with a thickness of about 25 microns and with grit particles having a mean diameter of 50 microns so that one-half the surface of each particle is exposed and available for cutting contact with a workpiece while the other half is secured within the carrier. Best results are also achieved with a distribution of abrasive grit particles over approximately 5% of the total coated surface area.

The particular resins used as a carrier are important to the proper functioning of the invention. The resin must be of such a structure to retain the particles stationary without being so brittle as to break down or crumple under high bearing pressure. It has been determined that the resins of the class of nitrocellulose, acrylic, vinyl chlorinated and alkyd are particularly suited for use as a rigid carrier for the abrasive grit particles.

The choice of grit particles is critical to the performance of the invention. The class of aluminum oxide, pomice, silicon carbide and silicon dioxide have been found to be particularly desirable in the invention since they are not susceptible to surface wetting action of the fastener or workpiece materials. These particles are all generally chemically inert and thus do not act as catalysts nor do they promote corrosion of the plated fastener.

Thus, there has now been provided a threaded fastener with a unique coating which includes a particular resin-type carrier and particular abrasive particles embedded therein. The carrier and abrasive particles are particularly chosen to allow the fastener to retain its corrosive-resistant properties and yet provide stable, small, substantially undiscernible cutting edges beneath the bearing surface of the fastener head and adapted to cut into the surfaces of the fastener and the surfaces of the workpiece when torque pressures are applied.

I claim:

1. A fastener with an enlarged head and elongated shank including a coating applied to both the undersurface of the head and at least the upper extremity of the elongated shank comprised of a resin carrier chosen from the group consisting of nitrocellulose, acrylic, vinyl chlorinated and alkyd and abrasive grit particles embedded therein, the particles chosen from the group consisting of aluminum oxide, pomice, silicon carbide, silicon dioxide, said particles being of a mesh size of 120–600 and having a mean diameter greater than the thickness of the resin carrier to assure contact of said particles with the fastener surfaces and the workpiece with which the fastener is associated, the coating including 3%–10% by weight of said abrasive grit particles, the fastener further including a corrosive resistant layer on the surface thereof beneath the coating wherein the grit particles are stationarily retained in the carrier to maximize the differential between the torque required to drive the fastener and the torque required to strip the fastener in an associated workpiece when the fastener is driven therein.

2. The fastener in accordance with claim 1, wherein the coating includes silicon carbide grit particles of 280–320 mesh size.

* * * * *